United States Patent
Hu et al.

(10) Patent No.: US 8,409,741 B2
(45) Date of Patent: Apr. 2, 2013

(54) COVER LATCH MECHANISM AND PORTABLE ELECTRONIC DEVICE USING SAME

(75) Inventors: Chia-Wei Hu, Taipei Hsien (TW); Chih-Chiang Chang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 1213 days.

(21) Appl. No.: 12/238,543

(22) Filed: Sep. 26, 2008

(65) Prior Publication Data
US 2009/0291356 A1   Nov. 26, 2009

(30) Foreign Application Priority Data
May 23, 2008   (CN) .......................... 2008 1 0301751

(51) Int. Cl.
*H01M 2/02* (2006.01)
(52) U.S. Cl. ........................ 429/100; 292/137
(58) Field of Classification Search .................. 220/326, 220/322, 324, 351, 812, 345.3, 797, 350, 220/229, 253; 292/8, 18, 38, 30, 47, 49, 292/127, 159, 137, 157, 162, 166, 168, 174, 292/146, 147, 150, 14, 16, 17, 19, 20, 74, 292/76, 80, 81, 87, 88, 300, 302, 303, 359, 292/358, 352, 341.15, DIG. 11, DIG. 61, 292/DIG. 55; 24/460, 640, 601.6, 612, 639, 24/706.8
See application file for complete search history.

(56) References Cited

U.S. PATENT DOCUMENTS

| | | | | | |
|---|---|---|---|---|---|
| 269,806 | A | * | 12/1882 | McArthur | 292/17 |
| 565,115 | A | * | 8/1896 | Mayfield | 292/137 |
| 4,913,984 | A | * | 4/1990 | Shimizu | 429/97 |
| 2001/0048585 | A1 | * | 12/2001 | Imsand | 361/681 |
| 2004/0018420 | A1 | * | 1/2004 | Nakajima et al. | 429/97 |

FOREIGN PATENT DOCUMENTS

| TW | 200643684 | * | 12/2006 |
|---|---|---|---|
| TW | 200643684 | A | 12/2006 |

* cited by examiner

*Primary Examiner* — Maria J Laios
(74) *Attorney, Agent, or Firm* — Altis Law Group, Inc.

(57) ABSTRACT

A cover latching mechanism (100) used in a portable electronic device is described including a latching base (20), a cover member (10), and a latching member (30). The cover member has a latching protrusion (14) arranged thereon. The latching member is used to latch the cover member to the latching base and defines a latch space (338) and a release space (337). The cover member can be latched to the latching base by a movement of the latching protrusion from the release space into the latch space, and then be released from the latching base by an opposite movement of the latching protrusion from the latch space into the release space, the two movements being caused by pushing or pulling the cover member along the latching base.

7 Claims, 5 Drawing Sheets

COVER LATCH MECHANISM AND PORTABLE ELECTRONIC DEVICE USING SAME

BACKGROUND

1. Field of the Invention

The invention relates to cover latch mechanisms used in portable electronic devices.

2. Description of Related Art

Portable electronic devices usually include latch mechanisms to latch covers (such as battery covers) to housings. The latch mechanisms must tolerate frequent installation and removal of the cover relative to the housing.

A cover latch mechanism usually includes hooks on the cover and grooves in the housing. The hooks can be hooked into the grooves, thus latching the cover to the housing. However, when removing the cover relative to the housing, a large amount of force is often required to be exerted on the cover. The cover may easily be damaged, thus the cover latch mechanism may fail.

Therefore, there is room for improvement within the art.

BRIEF DESCRIPTION OF THE DRAWINGS

Many aspects of the exemplary cover latch mechanism and a portable electronic device using the cover latch mechanism can be better understood with reference to the following drawings. These drawings are not necessarily drawn to scale, the emphasis instead being placed upon clearly illustrating the principles of the exemplary cover latch mechanism and the portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

Figure 1:
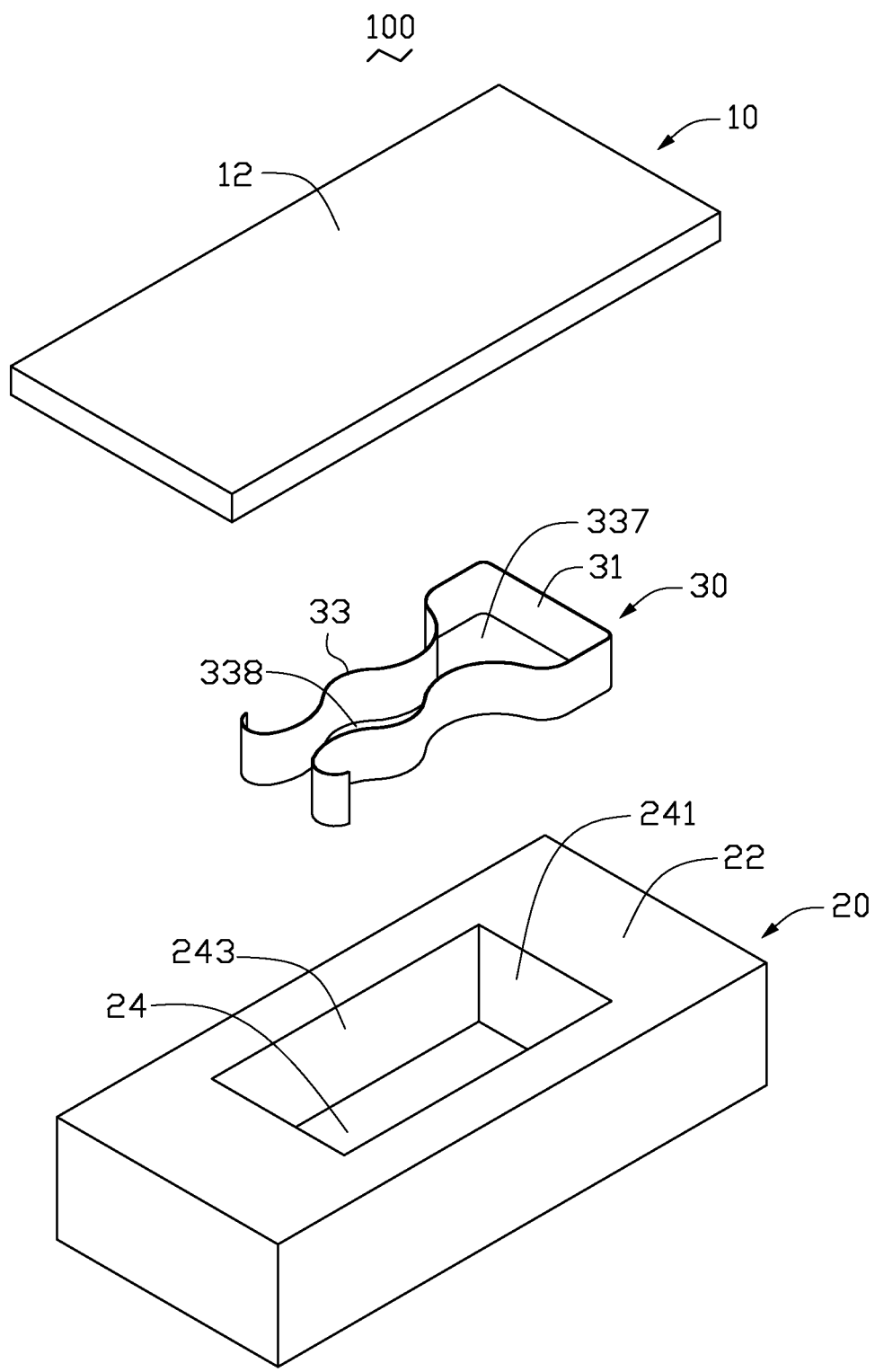
FIG. 1 is an isometric and exploded view of a cover latch mechanism according to the exemplary embodiment.
Figure 2:
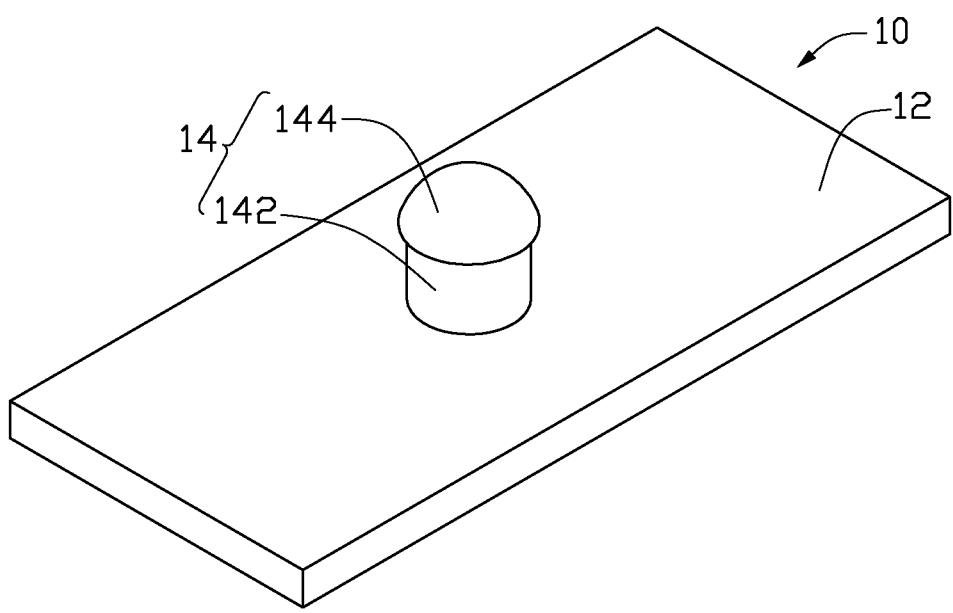
FIG. 2 is an enlarged view of a cover member shown in FIG. 1.

FIGS. 1 and 2 show an exemplary cover latch mechanism 100 suitably used in a portable electronic device (not labeled), such as a mobile phone. The cover latch mechanism 100 includes a cover member 10, a latching base 20, a latching member 30. The cover member 10 can be latched to the latching base 20 by the latching member 30. The cover member 10 can act as a cover of the portable electronic device. The latching base 20 can act as a housing of the portable electronic device. Thus, the cover member 10 may engage with and cover the latching base 20.

The cover member 10 includes a generally rectangular base portion 12 and a generally cylindrical latching protrusion 14. The latching protrusion 14 protrudes from a side surface of the base portion 10. The latching protrusion 14 includes a cylindrical latching portion 142 and a generally spherical retaining portion 144. The latching portion 142 is positioned between and connects the latching portion 142 and the retaining portion 144. The diameter of the retaining portion 144 is larger than the latching portion 142.

The latching base 20 is generally rectangular including a base 22. The base 22 defines a cavity 24 enclosed by four connecting interior walls 241 and 243. The cavity 24 is exposed to the outside for receiving and securing the latching member 30 therein.

The latching member 30 is an elastic sheet including a securing portion 31 and two latching arms 33. The securing portion 31 is frame-shaped defining a release space 337. The securing portion 31 is used to secure (such as co-molding) the latching member 30 to an interior wall 241 in the cavity 24. The release space 337 has a larger size than the latching portion 142 and the retaining portion 144.

The two latching arms 33 are wave-shaped, symmetrically extending from two opposite ends of the securing portion 31. The two latching arms 33 are on the same side of the securing portion 31. The two latching arms 33 defines a latch space 338 communicating with the release space 337. The latch space 338 is smaller than the release space 337. The latch space 338 corresponds to and latches the latching portion 142 in it. The latch space 338 can have substantially the same shape and size as the latching portion 142. Also, the latch space 338 can have a similar shape as the latching portion 142 and a smaller size than the latching portion 142.

Figure 3:
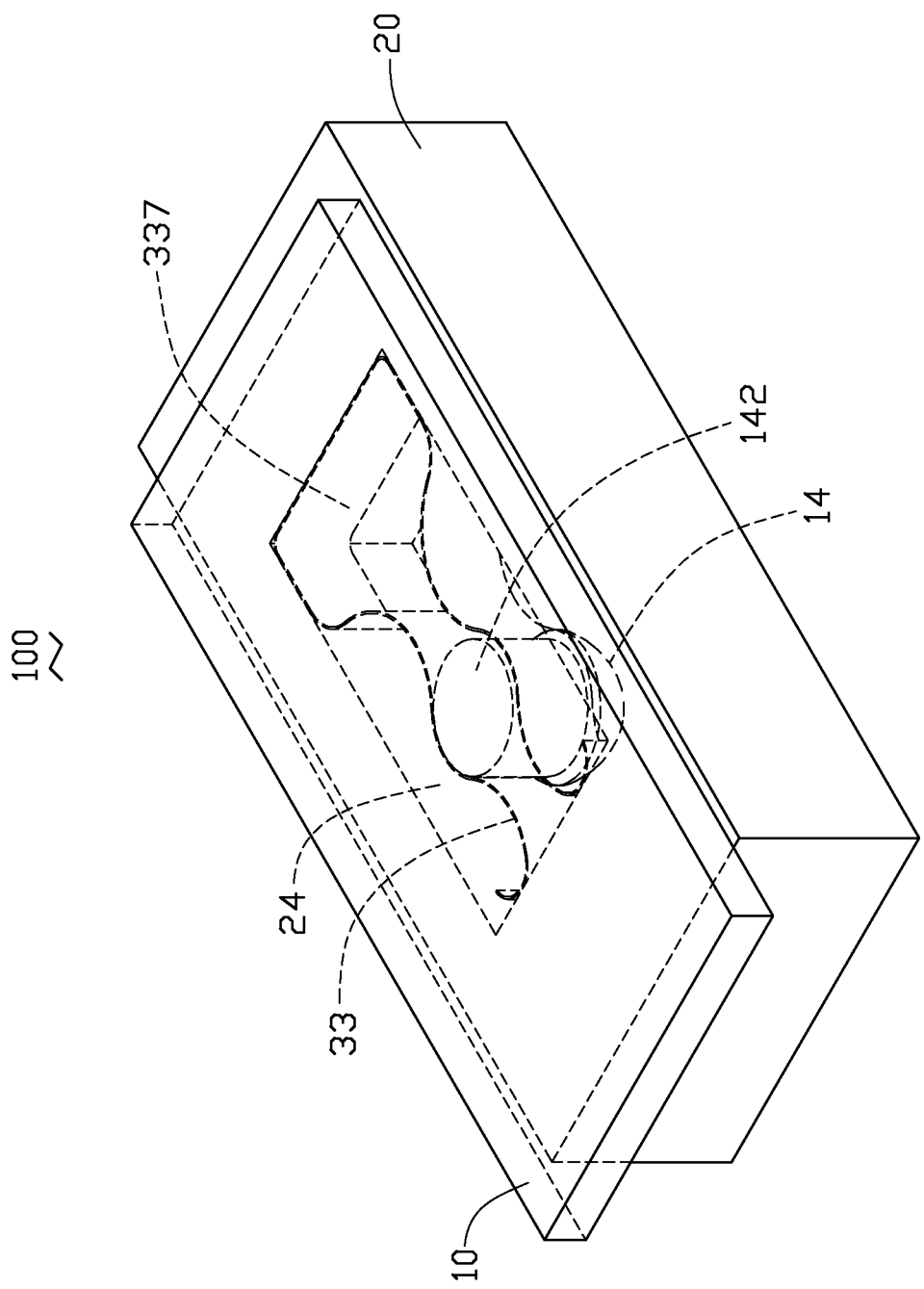
FIG. 3 is a perspective view of the cover latch mechanism in FIG. 1 at a latched state.

In FIG. 3, the cover latch mechanism 100 is in a latched state. The cover member 10 engages with and covers the latching base 20. The latch space 338 receives and latches the latching portion 142 therein. The two latching arms 33 surround and secure the latching portion 142 between them. The latching arms 33 are deformed by the resisting of the peripheral wall of the latching portion 142. The retaining portion 144 is retained below the latching arms 33 and in the cavity 24. Since the retaining portion 144 is larger than the latching portion 142, the retaining portion 144 can be retained by the latching arms 33, thereby preventing the cover member 10 from releasing from the latching base 20 along a vertical direction perpendicular to the latching base 20.

Figure 4:
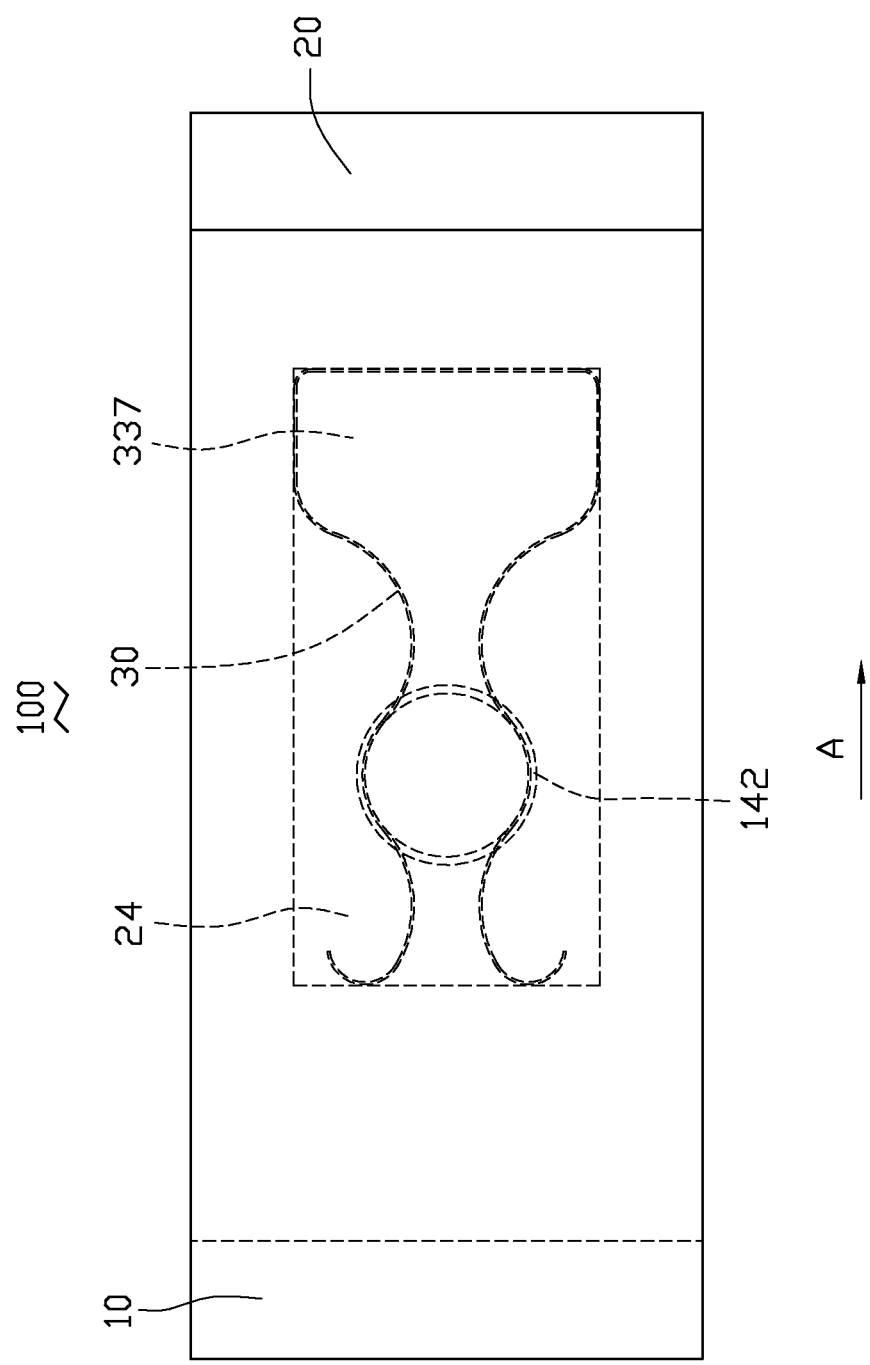
FIG. 4 is similar to FIG. 3 but viewed from top.
Figure 5:
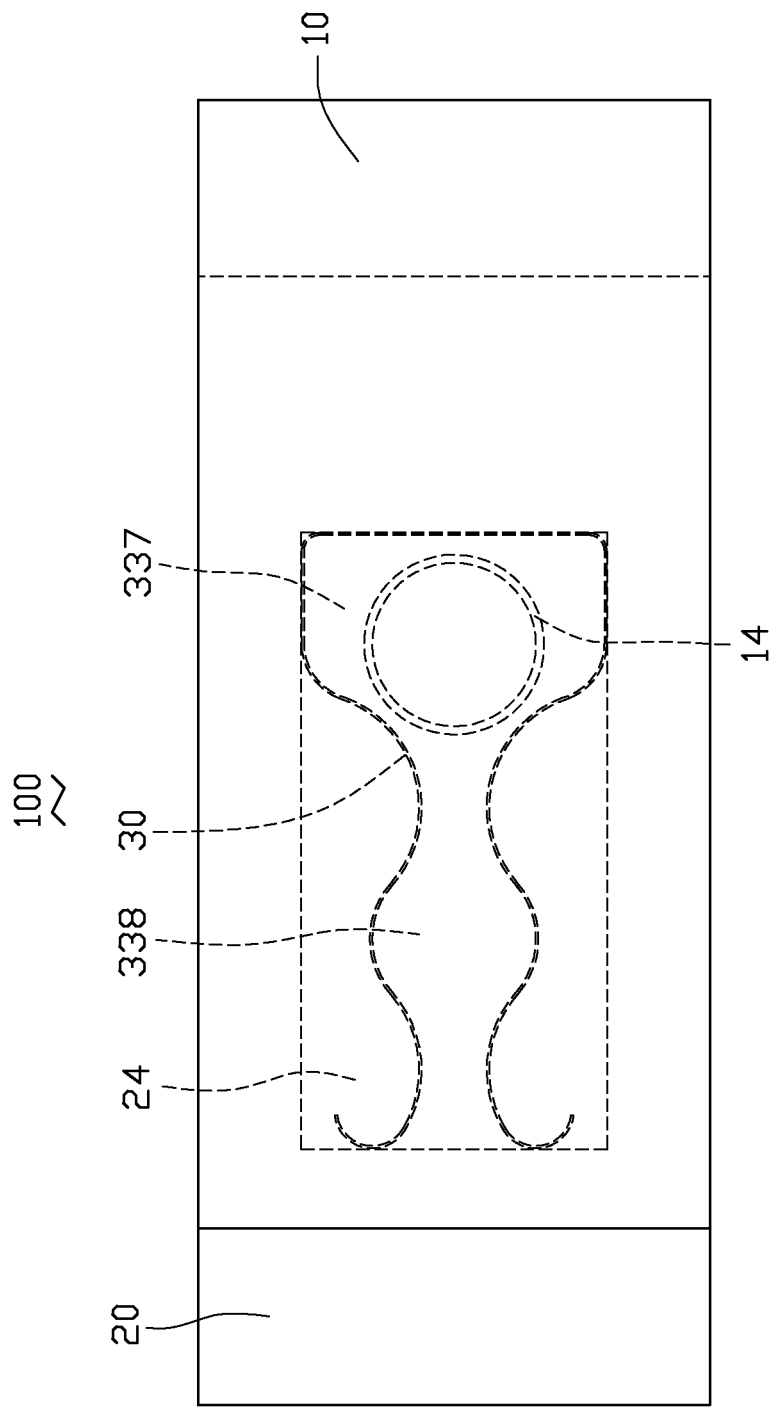
FIG. 5 is similar to FIG. 4 but showing a released state of the cover latch mechanism.

In FIGS. 4 and 5, the cover latch mechanism 100 is moved from the latched state to a released state, as the cover member 10 is pushed along an arrow A and moves along the latching base 20. The latching portion 142 moves along the latching arms 33 from the latch space 338 towards the release space 337 and extends the latching arms 33. The latching arms 33 accumulate the elastic force during this stage. When the latching portion 142 moves to a critical position relative to the latching arms 33, the latching arms 33 release their accumulated elastic force driving the latching portion 142 to move into the release space 337. Since the release space 337 is larger than the latching portion 142 and the retaining portion 144, the cover latch mechanism 100 is at the released state at which the cover member 10 can be removed from the latching base 20 simply by lifting the latching protrusion 14 upwardly from the release space 337.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device, comprising:
   a housing defining a cavity enclosed by a first connecting interior wall, a second connecting interior wall, a third connecting interior wall and a fourth connecting interior wall, the first connecting interior wall facing the third connecting interior wall, and the second connecting interior wall facing the fourth connecting interior wall;

a cover having a latching protrusion arranged thereon, wherein the cover and housing move relative to each other along a first axis during use of the device; and a latching member made of an elastic sheet including a frame shaped securing portion and two wave shaped latching arms, each wave shape latching arm having at least one peak and one trough, the frame shaped securing portion abutting the first connecting interior wall, the second connecting interior wall, the second connecting interior wall and the fourth connecting interior wall, the wave shaped latching arms spaced from the second connecting interior wall and the fourth connecting interior wall, distal ends of the wave shaped latching arms abutting against the third connecting interior wall, a latch spaced defined between the wave shaped latching arms and a release space defined in the securing portion;

wherein the cover can be latched to the housing by a movement of the latching protrusion from the release space into the latch space along the first axis, and then be released from the housing by an opposite movement of the latching protrusion from the latch space into the release space and a movement of the latching protrusion from the release space along an axis perpendicular to the first axis, the three movements being caused by pushing, pulling, and lifting the cover relative to the housing.

2. The portable electronic device as claimed in claim 1, wherein the latching protrusion is configured to be latched in the latch space and to be released from the release space.

3. The portable electronic device as claimed in claim 2, wherein the release space is larger than the latching protrusion, and the latch space is smaller than or with a same size and shape as the latching protrusion.

4. The portable electronic device as claimed in claim 2, wherein the latching portion is configured to latch into the latch space, and the latching protrusion comprises a retaining portion, the retaining portion is configured to retain the latching member.

5. The portable electronic device as claimed in claim 4, wherein the latching protrusion further comprises a latching portion, and the retaining portion is larger than the latching portion.

6. The portable electronic device as claimed in claim 5, wherein the latching member is deformable during the latching and releasing of the cover relative to the housing.

7. The portable electronic device as claimed in claim 1, wherein the cavity is exposed to an outside of the housing for receiving and securing the latching member therein.

\* \* \* \* \*